June 24, 1941.　　B. C. W. HAGELIN　　2,247,170
CIPHERING MACHINE
Filed Nov. 28, 1938　　7 Sheets-Sheet 1
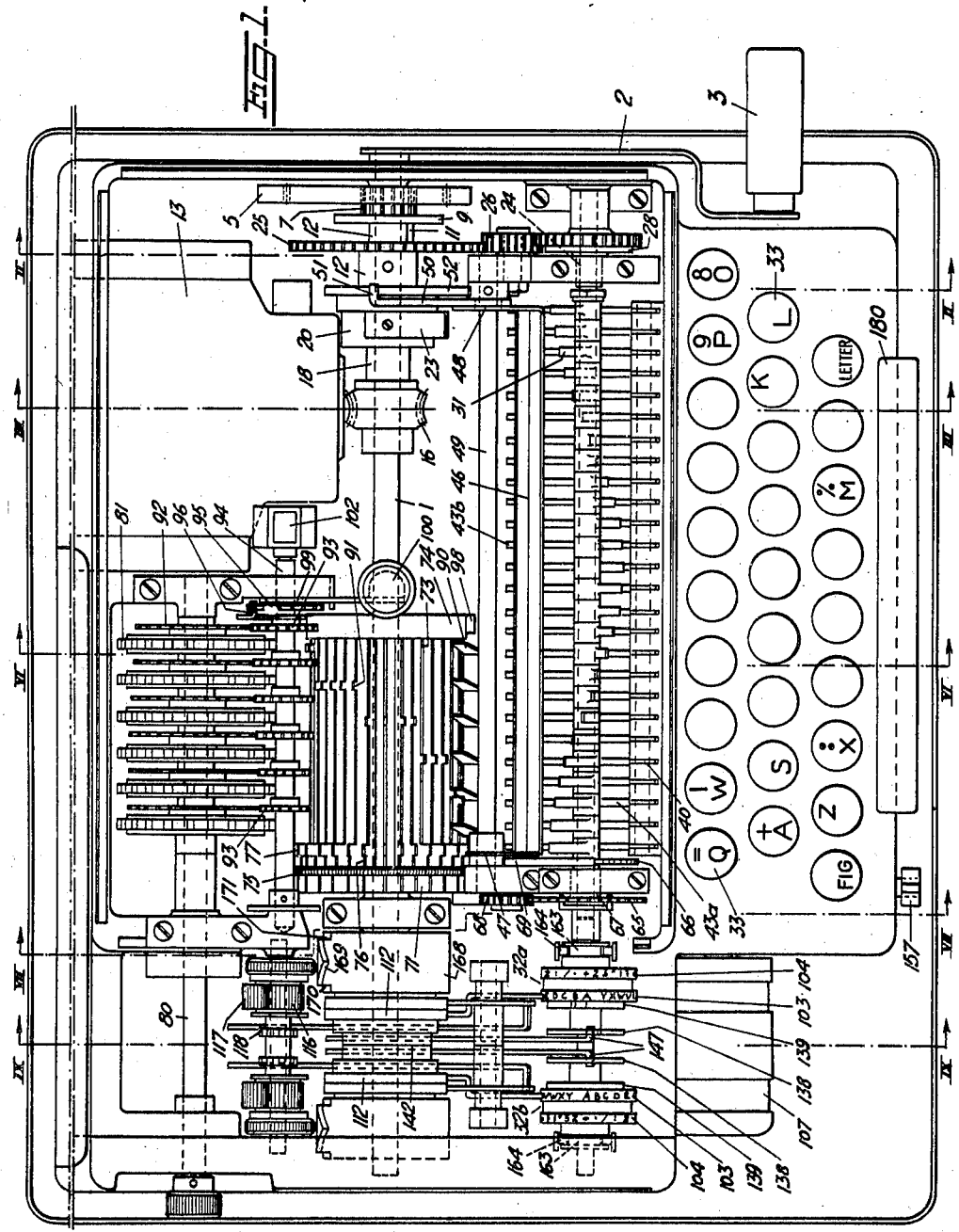

June 24, 1941.   B. C. W. HAGELIN   2,247,170
CIPHERING MACHINE
Filed Nov. 28, 1938   7 Sheets-Sheet 2
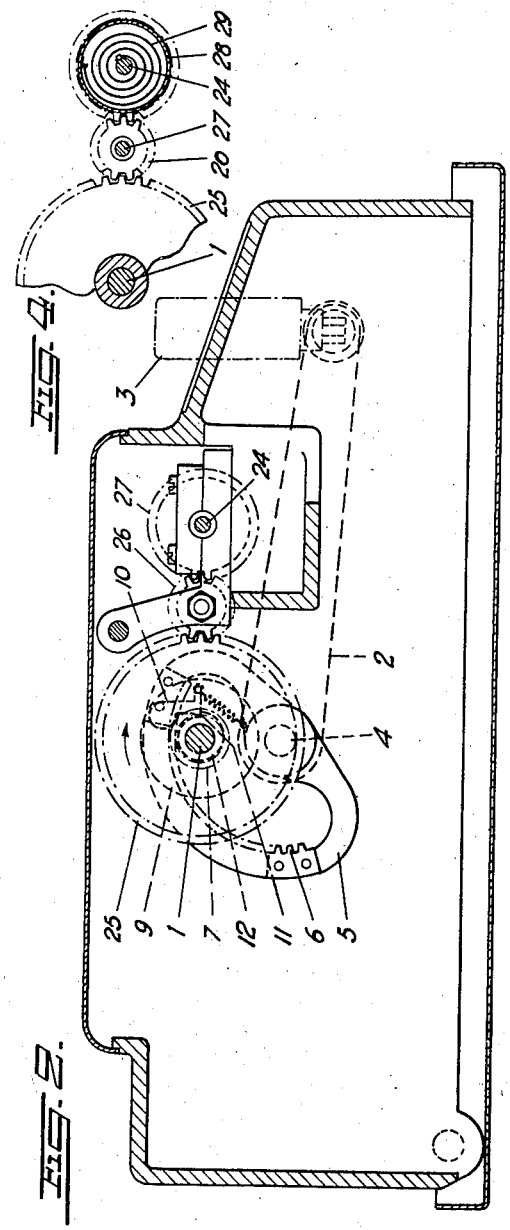
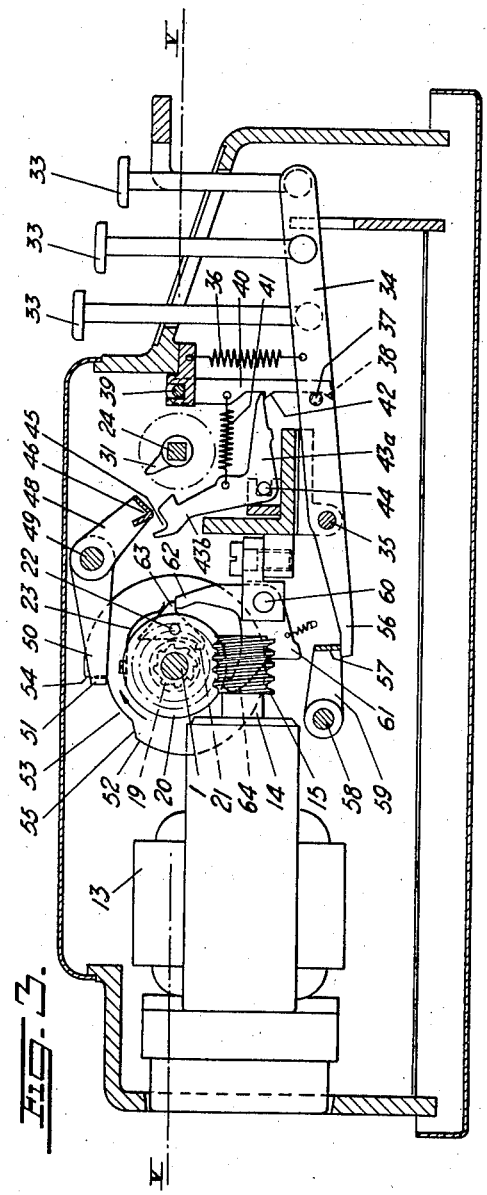
Inventor
Boris C. W. Hagelin,
By Sommers & Young Attys

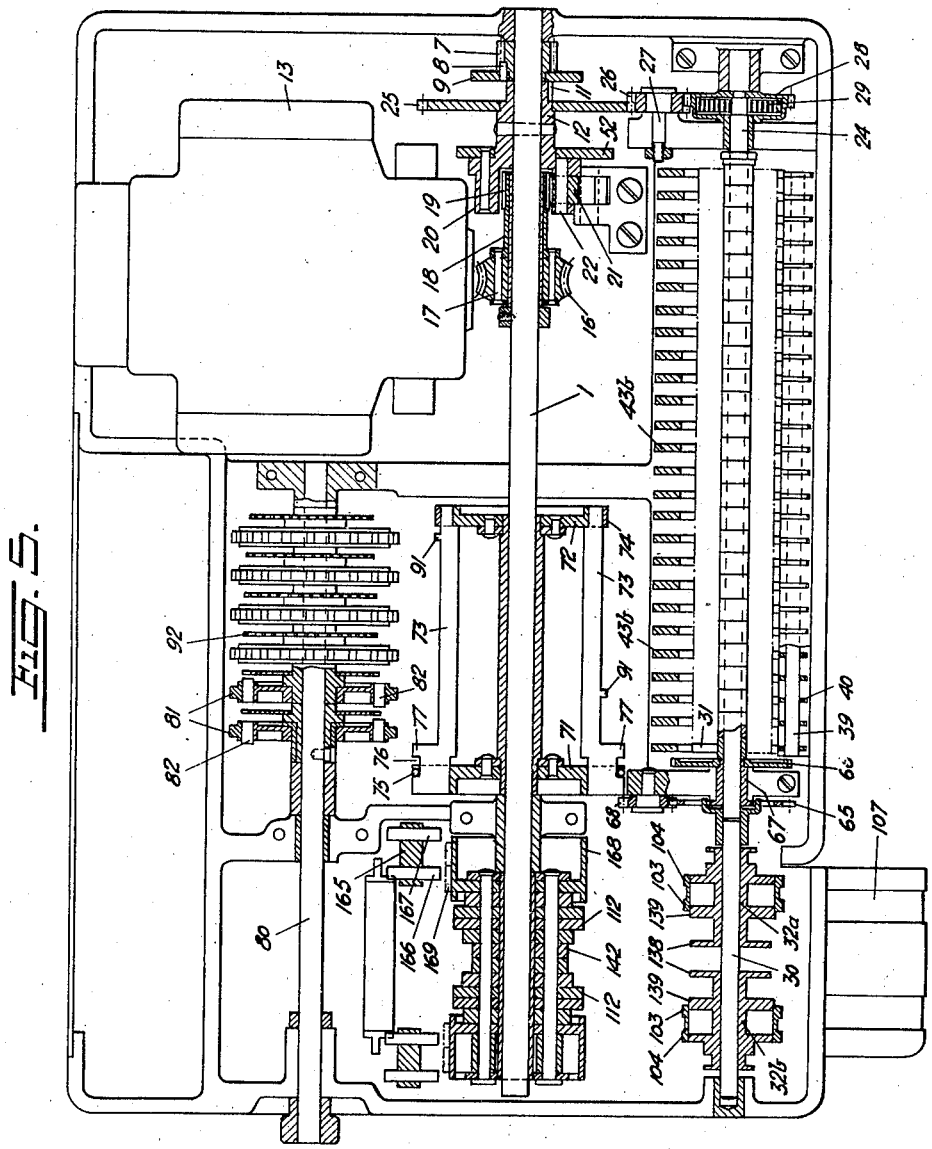

June 24, 1941.  B. C. W. HAGELIN  2,247,170
CIPHERING MACHINE
Filed Nov. 28, 1938   7 Sheets-Sheet 4
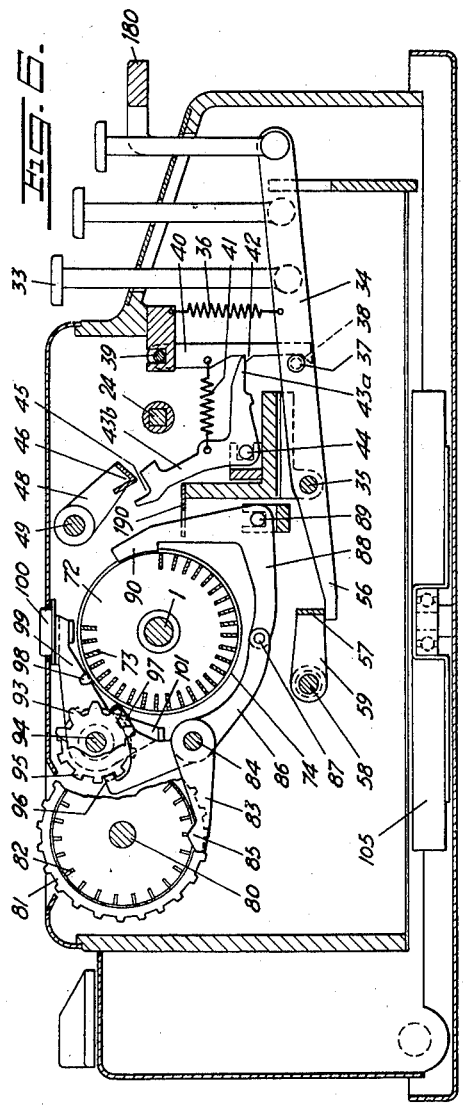
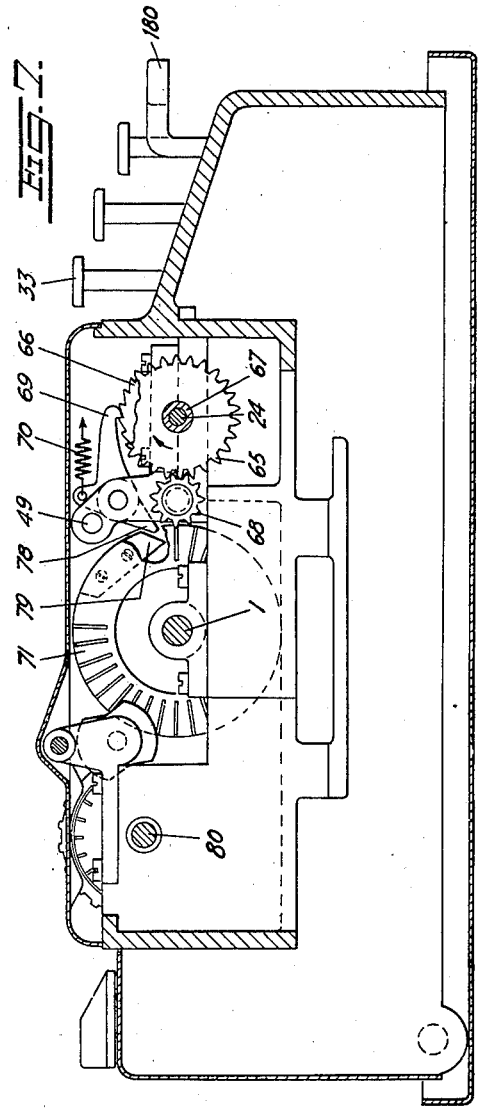

June 24, 1941.  B. C. W. HAGELIN  2,247,170
CIPHERING MACHINE
Filed Nov. 28, 1938   7 Sheets-Sheet 5
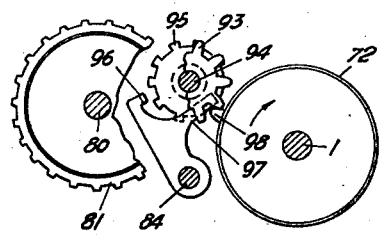
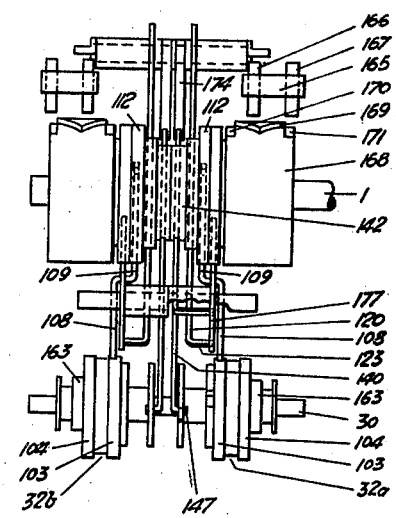

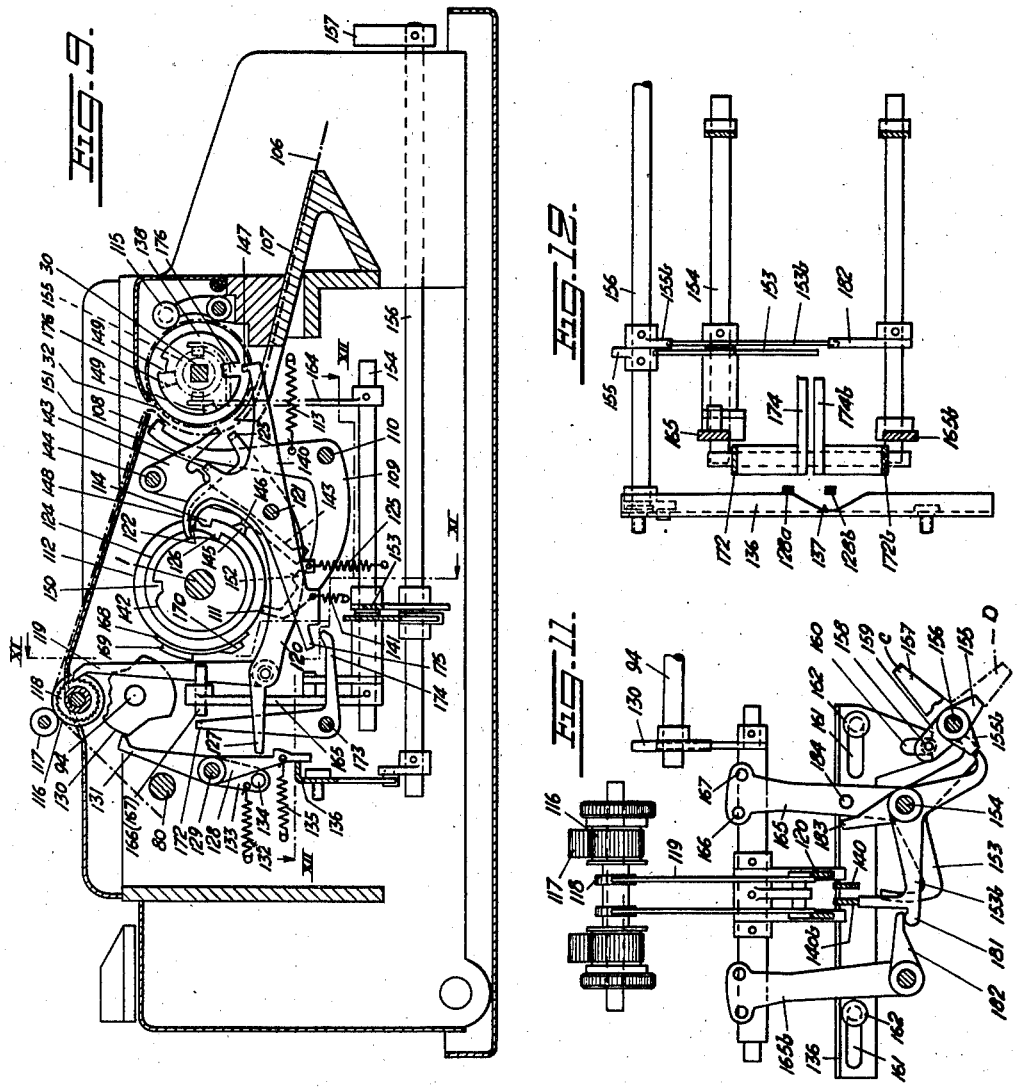

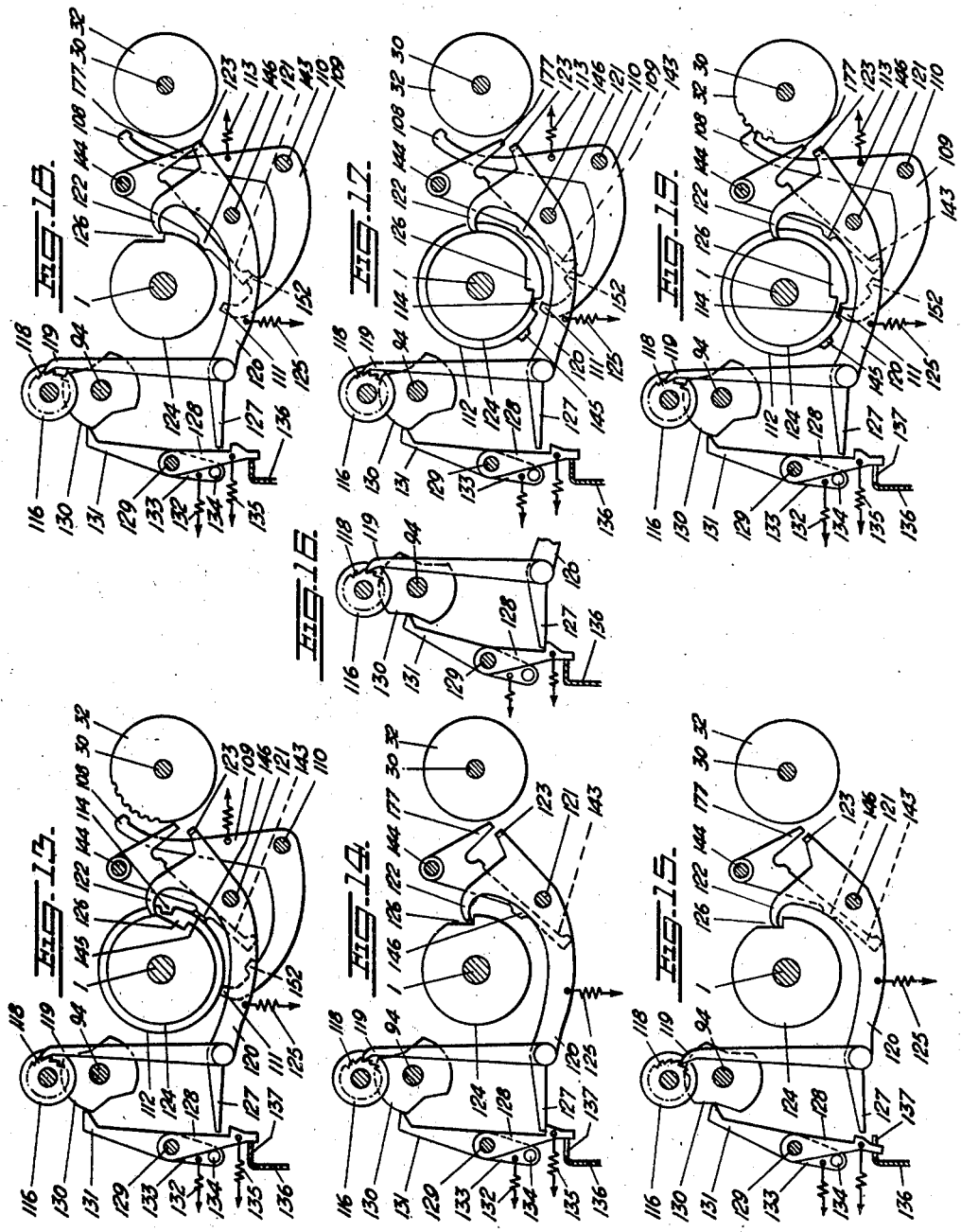

Patented June 24, 1941

2,247,170

UNITED STATES PATENT OFFICE 2,247,170

CIPHERING MACHINE

Boris Caesar Wilhelm Hagelin, Stockholm, Sweden

Application November 28, 1938, Serial No. 242,833

19 Claims. (Cl. 197—4)

The present invention relates to ciphering machines of the type in which the element carrying the secondary signs (i. e. the cipher signs in ciphering and the clear text signs in deciphering moves with the element carrying the primary signs (i. e. the clear text signs in ciphering and the cipher signs in deciphering) when the latter is set to indicate a primary sign, but is displaced after each such setting operation a number of steps which is determined in every individual case by mechanical means, before the reading or printing of the secondary sign, representing a cipher sign or the clear text sign, as the case may be, is effected. In well-known ciphering machines of this type the primary signs are carried, as a rule, by a rotatable disc which is rotated by hand for indicating a primary sign until the sign desired comes into register with an index. This rotation by hand requires a great deal of observation and is, thus, time-wasting, and an object of the invention is to provide a setting device which may be operated more rapidly and more reliably. Another object of the invention is to provide a printing mechanism by which the primary or the secondary text or both of them may be printed. Further objects of the invention will be apparent from the detailed description.

The invention is characterized, chiefly, by the fact that the ciphering machine is provided with a setting mechanism controlled by a keyboard by which upon the depression of a key in order to indicate a primary sign, a predetermined initial position is fixed for the element or elements carrying the secondary signs, from which position the displacement of said element or elements takes place. The displacement may, for instance, be of the type described in my U. S. Patent No. 2,089,603.

In the accompanying drawings a ciphering machine according to this invention is illustrated. Fig. 1 is a plan view of the machine with certain parts removed and certain other parts shown in section. Fig. 2 is a cross section on the line II—II of Fig. 1. Fig. 3 is a cross section on the line III—III of Fig. 1. Fig. 4 is a detail view, in part sectional elevation, of the gearing between the main shaft and the setting shaft of the machine. Fig. 5 is a horizontal section of the machine on the line V—V of Fig. 3. Figs. 6 and 7 are cross sections on the lines VI—VI and VII—VII, respectively, of Fig. 1. Fig. 8 is an elevation, partly in section, of part of the displacing mechanism. Fig. 9 is a cross section on the line IX—IX of Fig. 1. Fig. 10 is a plan view of certain parts of the printing device. Fig. 11 is an elevation, partly in section, of parts of the printing mechanism. Fig. 12 is a horizontal section on the line XII—XII of Fig. 9. Figs. 13–19 show details of the printing mechanism shown in different positions for illustrating the operation.

The machine rests on a base plate forming part of the rigid frame of the machine and the various elements of the machine except the keyboard and certain controlling and reading elements are enclosed in a casing having one or more covers to render the interior of the machine easily accessible.

1 indicates the main shaft of the machine which extends in the transverse direction, as seen from the front of the machine. The main shaft may be driven either manually or by a suitable motor. The manual driving means includes a crank 2 situated at the right-hand end of the machine which may be turned between a vertical and a horizontal position by means of a handle 3. In order that said handle may require a small space only, when the crank is in normal position, it may be swung upwards, as shown in Fig. 2.

The crank is carried by a shaft 4 extending parallel to the main shaft. The connection between the crank shaft 4 and the main shaft 1 comprises a frame 5 attached to the shaft 4 which is formed with an internal toothed arc 6 engaged by a pinion 7 rotatably mounted on the main shaft. Said pinion is rigidly connected as by pins 8, Fig. 5, to a disc 9 carrying a spring operated pawl 10 (not shown in Fig. 1) for engaging a tooth 11 formed on a hub 12 secured to the main shaft. As the crank 2 is turned from its vertical to its horizontal position, the disc 9 is caused to perform one revolution in the direction of the arrow, Fig. 2, causing the pawl 10 to move the tooth 11 and thus the hub 12 with the main shaft through one revolution. During the restoring of the crank from its horizontal to its vertical position which may be controlled by a spring, if desired, the pawl 10 slips around the hub 12 without moving same. Upon the completion of the revolution, the pawl comes again into engagement with the top surface of the tooth 11.

The driving motor consists in the example shown of an electric motor 13 the shaft 14 of which, Fig. 3, carries an endless screw 15 in mesh with a toothed wheel 16 rotatably mounted on the main shaft. Said toothed wheel is rigidly connected as by rivets 17 to the hub 18 of a ratchet wheel 19 likewise rotatably mounted on the main shaft 1. The ratchet wheel 19 is surrounded with a certain play by a sleeve-shaped flange 20 projecting from the hub 12 which carries a pawl 21 mounted at 22 and operated by a spring 23 which acts to move the pawl into engagement with the ratchet wheel 19.

The main shaft 1 is connected by a power storing gearing to a shaft 24 parallel with the main shaft which will be hereinafter referred to as the setting shaft. Said gearing comprises a toothed wheel 25 attached to the main shaft (cfr. Figs. 1, 2, 4 and 5), an intermediate toothed wheel 26 on a separate shaft 27 and a toothed rim on a spring housing 28 rotatably mounted on the setting shaft 24. Said spring housing contains a spiral spring 29, Figs. 4, 5, surrounding the shaft 24 the outer end of which is connected by a slip clutch to the spring housing 28, while the inner end of the spring is secured to the shaft 24. This gearing permits rotation of the main shaft even if the setting shaft 24 should be held against rotation, the power delivered from the main shaft being stored up in the spring 29 to be then utilized for rotating the shaft 24 as soon as the latter is released. Owing to the provision of the slip clutch the spring 29 can only be put under a predetermined maximum tension.

The setting shaft 24 is rotatably mounted in the frame of the machine and is connected at its left hand end by a fixed or disengaging clutch to a shaft 30, hereinafter referred to as the type wheel shaft, situated in alinement with the setting shaft. The setting shaft carries a set of stop cams 31 for a purpose hereinafter stated. The type wheel shaft carries two type wheels 32a and 32b, adapted to print the primary signs and the secondary signs, respectively. The same signs, usually the twenty-six letters of the alphabet, appear on both of the type wheels, though placed in the mutually reversed order.

The stop cams 31 carried by the setting shaft 24 are as many in number as there are letters on each type wheel, i. e. in the example under consideration, twenty-six. They are displaced peripherally in the same way as the letters of the type wheels, for instance, so that each type wheel letter is situated in axial register with its corresponding stop cam. The stop cams have for their object to allow the setting of the type wheel shaft into positions corresponding to the primary signs by means of a group of keys 33 (Fig. 1) of which there is one for each individual primary sign and some additional ones for special purposes. Each key is pivotally connected at its lower end to a lever 34 (Figs. 3 and 6) situated immediately above the base plate of the machine which is movable in a vertical plane substantially at right angles to the shafts of the machine. All of the levers 34 are journalled on a common shaft 35, but every lever is acted on by its individual spring 36 tending to keep the key in its raised position. At a point between the key and said shaft 35 the lever 34 carries a roller 37 on a laterally projecting stud. Bearing against this roller is an oblique surface 38 formed at the lower end of a depending arm 40 journalled at its upper end, as shown at 39. A spring 41 acts on said arm to maintain the oblique surface thereof in contact with the roller 37. The depending arm 40 is further formed with a stop 42 to be engaged by the free end of one arm 43a of a bell crank lever journalled at 44, the other arm 43b of which constitutes a stop arm for cooperation with one of the stop cams 31 on the setting shaft 24. The stop arm 43b is formed with a hooked end 45 to be engaged by a beam 46 extending parallel with the setting shaft which is supported by a pair of arms 47, 48 carried by a shaft 49 extending parallel with the main shaft. The right hand supporting arm 48 of the bridge also carries a rearwardly extending arm 50, Figs. 1, 3, the free end of which is laterally bent, as shown at 51, to bear on the periphery of a cam disc 52 on the main shaft 1. Said cam disc 52 is formed with a recess 53 adapted to receive the bent end 51 which is bounded at one end by a radial surface 54 corresponding to the plane front surface of the bent end 51, and at the other end by a sloping surface 55 (Fig. 3) adapted to engage the rounded back of the bent end 51.

Each key lever 34 is formed with a rearwardly projecting arm 56 bearing against the under side of an up and down movable beam 57 extending parallel to the main shaft of the machine which is supported by arms 59 carried by a shaft 58, likewise parallel with the main shaft. Said beam 57 is adapted to act from below on a bell crank lever 61 mounted on the shaft 60. Said bell crank lever comprises, in part, a stop arm 62 adapted to engage a detent 63 on the coupling pawl 21 and, in part, a restoring arm 64 adapted to cooperate with the same detent in a manner to be hereinafter described.

The setting shaft 24 carries in addition to the elements already mentioned, a toothed wheel 65 and a ratchet wheel 66 (see Figs. 1 and 7) both of which are rigidly connected to the setting shaft, preferably by being carried by one and the same hub 67. The toothed wheel 65 is in mesh with a pinion 68 carried by a separate shaft, and the ratchet wheel is engaged by a pawl 69 acted on by a spring 70. The pinion 68 and the pawl 69 are driven by a displacing drum carried by the main shaft. Said displacing drum comprises two end discs 71 and 72, respectively, attached to shaft 1 and a set of axially extending bars 73 carried by said discs which may be displaced axially in notches formed in the end disc which open at the periphery thereof. The bars are maintained in engagement wth said notches, in part, by a ring 74 surrounding the disc 72 and, in part, by an annular coiled spring 75 placed around the disc 71 which engages notches 76 formed in the bars. Said notches are such an axial length as to allow the bars to perform a certain axial displacement between two definite end positions. In one of said end positions, i. e. the normal position, shown in Fig. 5, the left hand end of the bars are situated in the same plane as the outer surface of the disc 71. In the other end position, i. e. the working position, the left hand ends of the bars project beyond the disc 71; in said last-mentioned position, the projecting ends may act as teeth in mesh with the pinion 68.

Each bar 73 is provided with an abutment 77 on the right hand end of the notch 76 for releasing the pawl 69. In the normal position of the bars said abutments are situated out of reach of the pawl 69; in the projected i. e. working, position of the bars, on the contrary, the abutments may engage a rearwardly extending arm 78 (Fig. 7) of the pawl 69 in order to lift the pawl out of engagement with the ratchet wheel 66. In addition, the disc 71 is provided with a laterally projecting cam 79 adapted at the beginning of each rotation of the drum from its normal position to operate said arm 78 in order to release the pawl 69 already after a very small rotation of the drum.

For effecting the setting of the bars 73 into working position there is a set of "key-wheels" similar in construction to those described in my Patent No. 2,089,603 above referred to. The key-wheels are rotatably mounted on a fixed shaft 80 extending parallel with the main shaft. Each key-wheel 81 carries an annular set of axially shiftable pins 82 mounted in axial apertures adjacent the periphery of the key-wheel which may be shifted individually so that they project beyond one lateral surface of the key-wheel, or the other. In Fig. 5 I have shown a rear pin of the extreme left hand key-wheel shifted to the left and a front pin of the same key-wheel shifted to the right. In one of said positions the pins are out of operation; in the other position they are adapted to trip levers 83 (Fig. 6) of which there is one for each key-wheel, said levers being situated close by the respective key-wheel on one side thereof. The levers 83 are rotatably mounted on a shaft 84. Each of them carries at its free end a wedge-shaped cam 85 projecting into the path of the pins shifted to the corresponding side of the respective key-wheel. The lever is rigidly connected by its hub to an arm 86 extending below the displacing drum which is pivoted at 87 to a bell crank lever 88 mounted at 89. Said bell crank lever surrounds a portion of the circumference of the displacing drum and carries at its upper end an axially beveled surface 90. Each such beveled surface 90 is adapted to be engaged by abutments 91 of certain bars 73 in a way to be hereinafter described. In the example illustrated the beveled surfaces 90 are located in the path of the respective abutments 91, when the corresponding cams 85 are not acted on by pins 82 (that is to say, when they are passed by pins shifted to the left). Of course, the arrangement may also be the reverse, if desired. The abutments 91 may either be fixed, as for instance, formed integrally with the bars, as shown in the drawings, or shifted to different points of the bars. To this end the bars may be formed with several notches or projections for fixing the positions of the abutments, which may in such case be saddle-shaped. Each bar 73 carries one abutment 91. The abutments of the various bars are arranged in groups in register with the various beveled surfaces 90. The number of bars belonging to the individual groups should, preferably, be so chosen as to allow any desired number of bars, that is to say, from one to the total number of bars, for instance twenty-six, to be displaced to the left, i. e. into operative position, under the influence of one or more or all groups of abutments. The levers 88 are prevented from lateral movements by a stationary comb-shaped guiding member 190.

Rotatably mounted on the shaft 80 adjacent each key-wheel is a toothed wheel 92 connected to the respective key-wheel by a clutch, not shown, which causes the toothed wheel to partake of the rotation of the key-wheel in one direction but permits independent rotation of the toothed wheel in the opposite direction. The toothed wheels 92 have each a different number of teeth. Said numbers are chosen so that they represent, as far as possible, prime factors or at any rate have no common denominator in order that the key-wheels may return to their original starting position only after a very long period of step-by-step movement, corresponding to the product of the numbers of teeth of all of the toothed wheels. Meshing in each toothed wheel 92 is a pinion 93 carried by a shaft 94 common to all of the pinions 93. The pinions 93 are all rigidly secured to shaft 94 and all of them have the same number of teeth, though their diameters are different as determined by the different sizes of the toothed wheels 92.

A number of signs (not shown), as for instance, the letters of the alphabet, appear upon the peripheral portion of each key-wheel 81, said letters being visible through apertures formed in the cover of the machine to indicate the position of the key-wheels. In order to facilitate rotation of each individual key-wheel by hand, the key-wheels are provided with tooth-like projections on their peripheral portion, as shown in Figs. 6 and 8.

The shaft 94 also carries a ratchet wheel 95, Figs. 1, 6 and 8, provided with as many teeth as there are teeth on each pinion 93. The pinion 93 is engaged by a pawl 96 provided with a release arm 97 to be acted on by a tooth 98 on disc 72. The pawl 95 may also be released manually by means of a lever 99 (Fig. 6) carrying a knob 100 for its operation. The release lever 99 is provided with a rearwardly extending arm 101 bearing on arm 97. The tooth 98 also acts to rotate the pinion 93 situated in register therewith, that is, the extreme right hand pinion, to the extent of one tooth pitch during each complete revolution of the displacing drum.

Connected with shaft 94 is a counting mechanism 102.

The operation of the setting and displacing mechanisms above described is as follows:

The machine is first adjusted, in order to bring it into correspondence with other machines of the same type, so as to function on a certain predetermined system. To this end some of the pins 82 of the key-wheels 81 are shifted to the left and others to the right in an order agreed on by the operators. The key-wheels are then rotated by hand until certain signs, likewise previously agreed on, appear in corresponding apertures in the cover of the casing.

In operation, whether for ciphering or deciphering a message, the primary signs are indicated by depressing the respective keys, sign by sign. After each depression the main shaft 1 is rotated one revolution either by operating the hand crank 2 or by transmission of power from the motor 13.

Normally, the setting and displacing elements are in the positions shown in the drawings. The main shaft 1 is held against rotation by the stop arm 62, and the bell crank levers 43a, 43b are held against movement by the stops 42 of the arms 40, with the arms 43b in their retracted position. The depressing of a key 33 causes the respective lever 34 to swing downwards, while its rear arm 36 moves upwards. When thus moving downwards the lever 34 by its roller 37 acts on the oblique surface 38 of arm 40, thereby bringing the stop 42 out of engagement with the arm 43a of the bell crank lever 43a, b. When thus released the stop arm 43b of the bell crank lever is moved forwards by the action of spring 41 so as to enter the path of the respective stop cam 31. In its upward movement the arm 56 lifts the beam 57, which in its turn lifts the lever 61, causing the stoparm 62 to release the detent 63 and bringing the restoring arm 64 into the path of the detent 63. When thus released by the stop arm 62, the coupling pawl 21 is moved by its spring 23 into engagement with the ratchet wheel 19, thereby coupling the main shaft 1 to the motor 13. The main shaft now starts rotation in the direction of the arrow, Fig. 3, by power derived from the running motor. When the detent 63 passes the restoring arm 64, the lever 61 is again swung down towards the beam 57 which has been lowered in the meantime as a result of the release of the depressed key. At the same time the stoparm 62 again enters the path of the detent 63. Upon the completion of the revolution of shaft 1, the stop arm 62 catches the detent 63 and moves the coupling pawl 21 out of engagement with the ratchet wheel 19, thereby interrupting the transmission of motor power to shaft 1. In case of manual operation, the coupling pawl 21 does not act as a driver because in this case the power is directly imparted to the main shaft which is caused to perform one complete revolution by moving the crank up and down one time, as already described per se. In this case the pawl 21 only acts to stop the main shaft in its fixed normal or starting position.

In the beginning of the rotation of the main shaft the rear arm 78 of the pawl 69 is engaged by the lateral cam 79 of the left hand disc 71 of the displacing drum and lifted out of engagement with the ratchet wheel 66 so as to release the setting shaft 24. By power stored up in the setting shaft's driving spring 29 as a result of a previous rotation of the main shaft, the setting shaft 24 is rotated in the direction of the arrow, Figs. 3 and 7, until that stop arm 43b which has been set to stop position by the depression of the key, is engaged by the respective stop cam 31. By said engagement the setting shaft is held in a position corresponding to the sign of the key depressed. Due to its connection with the setting shaft the type wheel shaft has performed exactly the same rotation as the setting shaft. On the right hand type wheel 32a, which is adapted to indicate the primary signs, the sign in question now appears in printing position. The secondary sign of the left hand typewheel 32a appearing in printing position is determined by the fact that the alphabets of the two type wheels are arranged in mutual reverse order. Printing of the primary sign may, if desired, be effected by aid of a mechanism to be described later on.

In the above said stop position of the stop arm 43b the hooked end 45 thereof bears against the beam 46 which is in the position shown in Fig. 3 in which position the lateral projection 51 of the arm 50 is in engagement with the recess 53 in the disc 52 while bearing against the radial end surface 54 thereof.

The rotation of the setting shaft 24 above described to effect the setting of the primary sign is completed during the first portion of the rotation of the primary shaft, inasmuch as the cam 79, as mentioned, at the very beginning of the rotation of the main shaft lifts the pawl 69 out of engagement with the ratchet wheel 66, thereby releasing the shaft 24, allowing it to be then rotated independently of the main shaft by power stored up in the spring 29 as a result of a prior rotation of the main shaft. In order to allow the setting shaft to travel its entire path of rotation, that is, up to a complete revolution, before any further function is derived from the main shaft, the operation of the setting shaft takes place during the movement of the detent 63 of the pawl 21 from the stop arm 62 to the restoring arm 64, whereas the other functions to be derived from the main shaft take place during the remaining portion of the rotation. If as the detent 63 strikes the restoring arm 64, the key depressed has not yet been released, the arm 64 cannot yield under the action of the pressure exerted by the detent 63 but will engage same, thereby checking the rotation of the main shaft. Only after the key is released the detent 63 may force the restoring arm 64 aside, allowing the main shaft to continue its rotation, until upon the completion of the revolution it is checked by the detent 63 engaging the stop arm 62.

During the said first portion of the rotation of the main shaft, that is, while the detent 63 moves between the stop arm 62 and the restoring arm 64, the projection 51 remains in contact with the bottom of the recess 53. During this portion of the rotation the beam 46 will, therefore, remain in the position shown in which the stop arm 43b maintains the setting shaft 24 in the position corresponding to the primary sign depressed. During the continued rotation of the main shaft the projection 51 is lifted by the sloping edge 55 of the recess 53, causing the beam 46 to swing rearwards so as to bring the stop arm 43b out of engagement with the stop cam 31, the arm 43a moving at the same time upwards towards the stop 42 of the arm 40. As the projection 51 reaches the cylindrical outer periphery of the disc 52, the arm 43a comes into contact with the upper face of the stop 42, thereby again checking the lever 43a, b in its normal position shown in Fig. 3. In the meantime the pawl 69 has been held in released state, because its rear arm 78 has been in contact with the cylindrical surface of the disc 79. When the stop arm 43a, b is released by the beam 46, the arm 78 leaves the said cylindrical surface, allowing the pawl 69 to again engage the ratchet wheel 66 under the action of its spring, thereby locking the shaft 24 in its set position. During the said continued rotation of the main shaft, that is, while the detent 63 is moving from the restoring arm 64 to the stop arm 62, the bars 73 of the displacing drum, which are only provided within a portion of the circumference of the drum corresponding to the angular extension of said continued rotation, enter the range where they can be influenced by the beveled surfaces 90. Those beveled surfaces 90 which are in operative position will effect a displacement to the left of those bars, the abutments 91 of which are acted on by the leveled surfaces 90 set to operative position. The left hand ends of said bars will, therefore, project beyond the left hand disc 71 of the drum so as to act as teeth meshing with the pinion 68. Consequently, said pinion during the said rotation of the drum will be rotated as many tooth pitches as there are bars 73 displaced to the left. The pinion 68 causes the toothed wheel 65 to make a corresponding rotation. As said toothed wheel is attached to the setting shaft 24 and the latter is rigidly connected to the type wheel shaft the type wheels will be rotated correspondingly. After this rotation or displacement the sign of the secondary type wheel 32b which in the example under consideration constitutes the cipher sign corresponding to the primary sign indicated by depressing the key, is now in the printing position. Each time the pinion 68 is rotated to the extent of one tooth pitch under the control of a bar 77, the pawl 69 is released by the action of the abutment 77 of said bar upon the rear arm 78 of the pawl. The shaft 24 is now released to allow the rotation of the toothed wheel 65. Each time the toothed wheel 65 is moved one tooth the pawl 69 again engages the ratchet wheel 66, so that the type wheel shaft cannot move more than one tooth pitch at a time. Thus, any unintentional rotation of the type wheel shaft is positively prevented.

The displacement of the type wheel shaft being completed, a printing of the cipher sign is effected during the last position of the revolution of the main shaft, after all of the bars of the displacing drum have passed the position where they may be engaged by the beveled displacing surfaces 90.

The mechanism for effecting the printing operation is now to be described.

As already stated, there are two type wheels 32a and 32b, the former (i. e. the right hand one) being adapted for printing the primary signs and the latter (i. e. the left hand one) for printing the secondary signs. Each type wheel is provided with two circular rows of types on its peripheral portion; one row, 103, containing the twenty-six letters of the alphabet and the other row, 104, containing other signs, as figures, punctuation marks and so on.

The printing mechanism includes for each type wheel 32a or 32b a paper supplying reel 105, Fig. 6, placed in the lowermost portion of the machine. From said paper reel a strip of paper 106 is led through guiding means, not shown, up into a guideway 107, Fig. 9, below the type wheels and further up between the respective type wheel and a printing hammer 108 adapted to press the strip of paper against the type to be printed. The printing hammer comprises one end of a bell crank lever 109 mounted on the shaft 110 which is provided at its other end with a projection 111 bearing against a cam disc 112, the printing cam, on the main shaft. The lever 109 is influenced by a spring 113 tending to pull the printing hammer against the type wheel and the projection 111 against the printing cam 112. The printing cam is provided with a recess 114 adapted to receive the projection 111 one time during each revolution of the main shaft, the projection being caused to engage said recess under the action of the spring 113. When this operation takes place the printing hammer 108 presses the paper strip against the type wheel, the printing operation, cfr. Fig. 19. Inking of the types is effected by an inking roller 115. The recess 114 in the printing cam 112 should, of course, be placed so that, when the main shaft starts its rotation due to the depression of a key, the recess 114 will not pass the printing projection 111 until after the type wheel has reached the printing position desired.

In order to feed the paper strip through the printing mechanism, the paper strip 106 after passing between the type wheel and the printing hammer, is placed over a portion of the cover of the machine to allow reading of the printed text and is then laid over a feed roller 116, against which the paper strip is pressed by a smaller roller 117. Rigidly attached to the feed roller is a ratchet wheel 118 engaged by the upper free end of a substantially vertical pawl 119 pivotally connected at its lower end to a feed lever 120. The feed lever is pivoted at 121 and provided with two arms, 122 and 123. The former bears against a cam disc 124, the feed cam, on the main shaft under the influence of a spring 125 and the latter constituted a stop arm adapted under certain conditions to prevent the paper feeding in a way to be hereinafter described. The feed cam is provided with a recess 126 so placed as to pass the arm 122 immediately before the main shaft completes its revolution. The arm 122 will then at once engage the recess to be thereafter gradually lifted onto the circular portion of the periphery of the disc 124. During this movement the pawl 119 is first lowered rapidly and lifted more slowly while turning the ratchet wheel 118 and the feed roller 116 a certain extent. Normally, the movement of the feed lever 120 is checked so that it is only allowed to move half the way that corresponds to the depth of the recess 126 of the feed cam 124. Due to this checking action the pawl 119 is lowered to an extent somewhat greater than the tooth pitch of the ratchet wheel 118, and as a result the feeding of the paper strip will correspond to one tooth pitch. The tooth pitch is so dimensioned as to allow the paper strip to be fed by steps equal to the normal letter pitch. In order to obtain the said checking of the feed motion the feed lever 120 is provided with a rearwardly extending arm 127 cooperating with a hook shaped stop arm 128 on the shaft 129. Fig. 13 shows the main shaft in its starting position and the feed pawl 119 in its uppermost position upon the completion of a feeding step.

In the printing of a cipher text it is desired, as a rule, to automatically divide the text into groups, each of which comprises five letters. To effect this "five division" the paper strip is fed to the extent of two tooth pitches after each fifth printing operation. To control this five division I use a division cam 130 rigidly mounted on the shaft 94 of the pinions 93. Said cam is provided with two diametrically opposite recesses on its periphery. Pulled against the division disc under the action of a spring 132 secured to a depending catch arm 133 is an upwardly directed arm 131 rigidly mounted on the shaft 129, hereinafter called the division arm. A laterally projecting pin 134 on said arm 133 is situated behind the stop arm 128. A spring 135 acts to pull the stop arm 128 against said pin. When the upper end of the division arm 131 is in contact with the circular portion of the periphery of the division cam 130, then the catch arm 133 moves the stop arm 128 to the stop position above referred to, in which position the rear arm 127 of the feed lever is checked by the stop arm after it has moved only to half the extent of its full stroke, as shown in Fig. 14. In the two positions appearing at every fifth printing operation, i. e. when the division arm engages the recesses of the division cam, the catch 133, 134 is moved rearwards so as to release the stop arm 128 and allow it to be pulled back by its spring 135; thus the hook of the stop arm comes out of the range of the rear arm 127 of the feed lever 120. The arm 122 of the feed lever can now move to the bottom of the recess 126, thereby allowing the feed lever to make a full stroke corresponding to a feeding of the ratchet wheel 118 to the extent of two tooth pitches, Fig. 15.

In the printing of the clear text no five division of the types shall take place, that is to say, the stop 128 shall always check the arm 127 of the feed lever. To this end a checking bar 136 is provided behind the stop arm. Said checking bar is movable in the direction normal to the plane of Fig. 15, that is, parallel to the main shaft 1, and is provided with a recess 137 which, when situated behind the stop arm, allows the rearward movement of said arm to effect the five division, but, when bearing with its straight-lined edge against the stop arm, prevents the rearward movement thereof, as shown in Fig. 16. In Fig. 12 the stop arm 128b of the secondary side is shown in the said first-mentioned position, while the stop arm 128a of the primary side is shown in the other position. The checking bar 136 is operated by a control shaft 156 extending in a direction at right angles to the main shaft of the machine. At the front of the machine said control shaft carries a handle 157. A stud 158 on an arm 159 of this shaft engages a vertical slot 160 in the bar 136 so that a rotation of the shaft 156 will effect a displacement of the checking bar (Fig. 11).

For producing word spaces one of the letters is reserved, in the example shown the letter X. Consequently, in printing the clear text the letter X must not be printed; instead thereof a space should appear on the paper. The device producing this effect comprises for each type wheel a selecting lever 140 mounted on the shaft 121 and acted on by a spring 141, a cam disc 142 rigidly mounted on the main shaft for controlling said lever, and a stop arm 143, mounted at its upper end on a shaft 144. Attached to the disc 112 on the main shaft, in the plane of said stop arm, is a retracting cam 145 adapted to engage an abutment 146 of the stop arm. The selecting lever 140 is provided with a plurality of operative arms. A forearm forms a laterally extending stop 147 adapted to cooperate with discs attached to the hub of the type wheel, said discs being hereinafter referred to as selecting discs; each type wheel has two such discs, one for each row of types. In the example shown, Figs. 1 and 5, 138 indicates the selecting disc corresponding to the row of letter types 103, and 139 indicates the selecting disc corresponding to the row of other types 104. According as the one row of types or the other is in operative position, one selecting disc or the other is situated right above the stop 147, yet out of contact therewith, as long as an upper arm 148 of the selecting lever bears against the circular portion of the periphery of the control disc 142. The selection disc 138 is provided with a notch 149 so positioned that, when the letter X is in the printing position, then said notch is just above the end 147 of the selecting lever. The control disc 142 is also provided with a notch 150 so positioned as to pass the upper arm 148 of the selecting lever immediately before the recess 114 of the printing cam 112 reaches the projection 111. By the action of the spring 141 the selecting lever is rocked, if the letter X is in the printing position, as the end 147 thereof can engage the notch 149 of the selecting disc. In this rocking movement a catch arm 151 of the selecting lever operates the stop arm 143, so that its lower end comes right opposite a stop 152 on the printing arm 109. When, immediately thereafter, the recess 114 of the printing cam 112 passes the projection 111, the printing lever 109 can only move to a small extent, namely, until the stop 152 strikes said lower end of the stop arm 143 and, as a result, no printing operation takes place. This position is shown in Fig. 17. Immediately prior to the main shaft completing its revolution, the cam 145 restores the stop arm 143 to its inoperative position. If the type wheel is in any printing position other than that corresponding to the letter X, then the selecting lever 140 cannot be rocked, because its fore end 147 will come into contact with the circular portion of the selecting disc 138.

In order to facilitate the operation of the machine to produce the word spaces, the key-board may be provided with a separate space key, which in the example shown is represented by a bar 180 coupled to the key for the letter X in a way, not shown, so that a depression of said bar will effect a depression of the X-key.

In the printing of cipher text it is necessary, however, also to print the letter X. To this end the rocking of the selecting lever 140 may be prevented completely by bringing a locking arm 153 into engagement with the lower edge of the rear arm of the lever. Thus, no rocking movement can take place, when the letter X is in the printing position. The locking arm 153 is mounted on a shaft 154 which extends parallel with the control shaft 156 above referred to and may be moved to operative position by the action of a cam 155 on the control shaft.

In the example shown, there are, as stated, two type wheels, the order of the letters of one wheel being the reverse of that of the other wheel, that is, the alphabets are reciprocal. It is also stated that the right hand type wheel 32a shown in the drawings carries the primary signs, that is, the clear text signs in ciphering and the cipher signs in deciphering. After the displacing mechanism has made its function, the corresponding secondary signs are printed by means of the left hand type wheel 32b, that is, in this example the cipher signs are printed in case of ciphering and the clear text signs in case of deciphering. If, as above presumed, the alphabet consists of the twenty-six letters of the international alphabet, then in printing the cipher signs all of said twenty-six letters will be utilized, while, as above described, in printing the clear text signs the letter X selected to indicate spaces, will not be printed.

It has proved desirable, however, in case of certain ciphering traffic, also to be able to direct cipher figures and other signs, in which case the cipher shall still only contain the twenty-six letters of the alphabet, whereas the clear text should be printed with all signs necessary for a correct reproduction of the message. This is enabled in connection with my improved ciphering machine in a manner similar to that utilized in connection with typewriters, by providing the keys with double signs and adding special keys for shifting from one series of signs to the other. In this case the corresponding double series of signs appear on the type wheels due to the provision of two circular rows of signs on each type wheel, namely one row 103, containing the twenty-six letters of the alphabet and another row 104, containing twenty-six other signs. By depressing any of the shift keys a lateral displacement of the type wheels should take place so as to bring the row of signs desired into printing position. Hereinafter, for the sake of clearness, the row of alphabet letters will be referred to as "series I," whereas the other row of signs will be called "series II." In printing the clear text both series should be used, in printing the cipher only the series I.

As distinguished from the usual typewriter, where the depressing of a shift key only makes the necessary shifting operation, the use of my improved ciphering machine for ciphering a message, requires printing also of the shift signs, that is, due to the depression of a shift key, which operation, however, must not effect printing of any primary sign, nor any feeding of the primary paper strip, a cipher letter shall be printed on the secondary paper strip after the displacing mechanism has made its operation. In deciphering these cipher signs which in the regular order appear on the primary paper strip, any printing must not take place on the secondary paper strip, nor any feeding of said strip; instead thereof the shift mechanism should be operated automatically so as to effect a corresponding shifting operation.

As it is thus necessary to also cipher the shift sign, there must be a place spared for this sign in each row. Another place has already been spared for indicating the word space, which should likewise, be ciphered. It is thus seen that two of the letters of the first series, in the example shown the letters Z and X, must be placed in the series II when effecting a ciphering operation.

It is evident from the above description that while in ciphering the space any printing must not take place, but only feeding of the paper, the ciphering of the shift must not effect either printing or paper feeding. In this case, the type wheel should be moved axially from the printing position belonging to the series I to the printing position belonging to the series II, or vice versa.

In order in a simple manner to permit said axial displacement of the type wheels while causing them to partake of the rotation of the type wheel shaft 30, said shaft is, preferably, square-shaped in cross section and the apertures of the hubs of the type wheels likewise square. The hubs of the type wheels are extended and each of them carries a flange 163 provided with an annular groove engaged by a fork 164. Said fork is attached to the free end of the shaft 154, which may be called "shift axle." The rear end of said shift axle carries a shift arm 165 extending upwardly to about the level of the main shaft 1. The shift arm carries at its upper end two parallel pins 166 and 167 slidably mounted in parallel holes in the shift arm. Both of said pins are situated immediately behind a shift disc 168 rigidly mounted on the main shaft 1. The pins may be pushed towards the shift disc so as to enter the path of a shift cam 169 thereon, when the main shaft makes its rotation. Let it be assumed, for instance, that the pin 166 is in its advanced position. After the main shaft has rotated nearly three-quarters of a revolution from its starting position, the upper end of the shift arm 165 due to the action of the shift cam 169 on the pin 166 will be moved to the left from the position shown in Fig. 11, so that also the type wheel 32a by means of the fork 164 upon the rotation of the shift axle, will be removed from its left hand position in which it is situated in the printing of the signs of series I, that is, with the row of signs 103 in printing position, and shifted to its left hand position, in which upon the next printing operation the row of types 104 containing the signs of series II is in printing position. When the main shaft starts its next rotation, the pin 166 is pushed back by the action of a (left hand) restoring cam 170 on disc 168 (Fig. 10). When the shift arm 165 and the type wheel 32a are in the said left hand position and the pin 167 is in its operative position, the type wheel 32a will be shifted with the aid of the shift cam 169 to the right hand position, whereupon the pin 167 is restored by a corresponding (right hand) restoring cam 171 on the disc 168.

The displacement of the pins 166, 167 into the path of the shift cam 169 is effected by means of a control arm 172 attached to a shaft 173 parallel with the main shaft which is formed integrally with or connected to a forwardly extending arm 174 the free end of which is situated slightly below the rear end 175 of the selecting lever 140.

To the row of types 104 containing the signs of series II belongs a selecting disc 139 rigidly connected to the type wheel. With the row of types 103 in printing position, the selecting disc 138 is situated above the end 147 of the selecting lever and with the row of types 104 in printing position the selecting disc 139 is situated above said end 147. The selecting discs have each two notches, a shallow one, 149, and a deep one, 176. The shallow notch 149 is adapted to prevent the type printing, when word space is to be effected, as already described in connection with the disc 138, that is, said notch is right above the end 147 of the selecting lever, when the space sign of the respective series of signs reaches the printing position. The deeper notch 176 controls the shifting operation.

In order to effect the shifting operation it is required, as already stated, that one of the pins 166, 167 is pushed forwards, when the shift sign reaches the printing position. The shifting movement is initiated by the end 147 of the selecting lever entering one of the deep notches 176. At this movement of the selecting lever the rear end thereof strikes the arm 174 and depresses same to a sufficient extent to cause the control arm 172 to advance and operate that one of the pins 166, 167, which for the time being is situated in front of said arm. The shifting operation is then carried out in the way above described. As stated, both the type printing and the paper feeding should be eliminated during the shifting operation. The type printing is prevented in the same way as above described in connection with the production of word spaces with the exception that, as the rocking movement of the selecting lever is greater in case of the shifting operation than it is in case of the word space operation, the lever end of the stop arm 143 moves rearwardly to a larger extent than it does in connection with the word space operation (Fig. 18). The paper feed is eliminated in case of the shifting operation by means of a separate stop arm 177 rigidly connected to the stop arm 143. As the selecting lever 140 makes its larger rocking motion and moves the stop arm 143 the end of the stop arm 177 comes to bear against the stop finger 123 of the feed lever 120, thereby preventing the feed lever from operation with resulting suppressing of the paper feeding. This position is shown in Fig. 18. When retracted the end of the stop arm 177 is on such a distance from the stop finger 123 that when the selecting lever 140 makes its smaller rocking movement—that is, to produce a word space—then the stop arm 177 cannot reach the position necessary for locking the feed lever. Thus the paper feeding is only eliminated in case of the shifting operation.

The printing mechanism above described has reference only to the printing of the primary text. To print the secondary text a quite similar mechanism is used.

As regards the shifting movement, there exists a certain relationship between the primary and the secondary elements of the machine, depending thereon, that in printing the clear text types of both series I and II should be printed, in printing the cipher only types of the series I. This means that in ciphering the primary text should be printed with the use of both series of types, the secondary text with the use of types belonging to series I only, whereas in deciphering the primary text should be printed by types belonging to series I, the secondary text by types of both series. Mechanically, this problem has been solved in the way shown in Fig. 11. The handle 157 of the control shaft 156 may be set into two positions, viz. an upper one for ciphering (marked C) and a lower one for deciphering (marked D). In the said first mentioned position a cam 155b on the shaft 156 maintains a locking arm 153b belonging to the secondary side of the machine in an elevated position in contact with the secondary selecting arm 140 in order to prevent any rocking movement of the latter. It is thus seen that the letter X can be printed on the secondary type wheel, which in this case represents the cipher text. In the meantime the secondary shift arm 165b is held against movement in its left hand position (for printing types of series I) by a projection 181 of the locking arm 153b bearing against the under edge of a lateral arm 183 connected to the shift arm 165b. The primary shift arm 165 is free to effect shifting between the series of types I and II, and the primary locking arm 153 is out of the path of the corresponding selecting arm 140. It is thus seen that primary types of both series of signs may be printed but only secondary signs of the series I.

In deciphering the control handle is in the position D. In this position the cam 155 maintains the locking arm 153 in lifted position. Consequently, the primary selecting lever 140 cannot make its rocking movement. As will appear from the foregoing description the letter X cannot be printed by the primary type wheel. At the same time an arm 183 rigidly connected to the locking arm bears against a lateral projection 184 of the primary shift arm 165 to retain the latter in its right hand position, that is, with the series of types I in printing position. The secondary locking arm 153b, on the contrary, is out of contact with its respective cam 155b; therefore, the shift arm 165b can be operated to move the series of types I or II, as the case may be, into printing position. In this case the respective selecting lever is free to rock, thereby preventing the printing of the letter X.

It is to be noted that, when two alphabets are used and printing shall take place on two strips of paper, as above presumed, then it is required, when the two alphabets are different from each other, that the displacing series for the deciphering operation consists of numbers forming the complement numbers of the displacing series for the ciphering operation. In case of two equal, but reciprocal alphabets, the same displacing series may be used both in the ciphering and the deciphering operation.

In case of simultaneous printing of clear text and cipher text care should be taken that the primary signs are printed, before the displacing mechanism has started its operation, and that the secondary signs are printed, after the displacing mechanism has completed its operation.

It is further to be noted that modifications may be made without departing from the principle of the invention. For instance, instead of using a power storing gearing between the main shaft and the setting shaft I may connect the constantly running motor to the setting shaft by a friction clutch. The power storing gearing, however, is of advantage as far as the manual drive of the machine is concerned, as it permits a rapid setting operation.

What I claim is:

1. In a ciphering machine, means for reproducing primary signs, other means for reproducing secondary signs, a rotatable shaft for carrying said reproducing means, a series of keys each corresponding to a primary sign, means operable by said keys to fix predetermined starting positions of said shaft corresponding to the various primary signs, means to move said shaft after each depression of a key to the corresponding predetermined position presenting a primary sign, and means to effect a further movement of said shaft from each such starting position to a position for reproducing the secondary sign corresponding to the primary sign as determined by the key depressed.

2. In a ciphering machine, rotatable means for reproducing the primary signs, other rotatable means for reproducing the secondary signs, a shaft to effect the rotation of said means, a series of stop elements on said shaft displaced with relation to each other both axially and circumferentially, a series of movable stop elements each arranged to engage an individual one of the stop elements of said shaft for fixing predetermined set positions thereof corresponding to the various primary signs, a series of keys for operating said movable stop elements, means for moving the shaft after each depression of a key to the corresponding set position for presenting the primary sign selected, and means for effecting a further movement of the shaft from each such set position to a further position corresponding to a related secondary sign.

3. In a ciphering machine, rotatable type wheels having primary and secondary signs, a shaft to effect rotation of said type wheels, a series of stop elements on said shaft to fix predetermined set positions of the shaft corresponding to primary signs of said type wheels, a series of movable stop elements each adapted to engage an individual one of the stop elements of said shaft, a series of keys to operate said movable stop elements, means to rotate the shaft after each depression of a key to the position corresponding to the key depressed presenting the primary sign corresponding to the key depressed, means to effect a further rotation of the shaft and type wheels to position for reproducing a secondary sign corresponding to said first-mentioned sign, and means for printing said secondary signs.

4. In a ciphering machine, a rotatable shaft, type wheels on said shaft, a series of keys, means operable by said keys for fixing predetermined set positions of said shaft and type wheels, a main driving shaft, means connecting said shafts including a gearing and a power storing mechanism, means to allow said first-mentioned shaft to be rotated by said power storing mechanism after each depression of a key to the corresponding set position for presenting a type of one of said wheels, means to effect a further rotation of the shaft from said set position through said gearing, and means for printing a type corresponding to said first-mentioned type in a ciphering system.

5. In a ciphering machine, a rotatable shaft, type wheels on said shaft, said type wheels carrying primary and secondary signs, a series of keys, means operable by said keys for fixing predetermined set positions of said shaft corresponding to the said primary signs, a main driving shaft, means connecting said shafts including a power storing mechanism operable by said main shaft for allowing the type wheel shaft after each depression of a key to move to the corresponding position under the influence of said power storing connection for presenting a primary sign of one of said wheels in position to be printed, means operable by the main shaft to effect a further movement of the type wheel shaft from each set position thereof to bring a corresponding secondary sign in position to be printed, and means for printing said primary and secondary signs.

6. In a ciphering machine, type wheels carrying primary and secondary signs, a rotatable shaft for carrying said type wheels, a series of keys, means operable by said keys for fixing predetermined set positions of said shaft and wheels corresponding to the primary signs of the type wheels, a main driving shaft, means including a power storing mechanism for connecting said main shaft and the type wheel shaft, means to cause said main shaft to make a complete revolution after each depression of a key, a displacing drum on said main shaft, means on said displacing drum to allow the type wheel shaft after each depression of a key to move to the set position corresponding to the key depressed under the influence of said power storing mechanism for presenting the primary sign set in position thereby, and means carried by said drum to effect a rotation of the type wheel shaft subsequent to each initial setting thereof to a position in which a secondary sign corresponding to said primary sign in a ciphering system is set in position.

7. A ciphering machine as claimed in claim 6 and in which the displacing drum has means for positively rotating the type wheel shaft step-by-step and for locking it against rotation subsequent to each step thereof.

8. In a ciphering machine, type wheels carrying primary signs and secondary signs, a rotatable shaft for carrying said type wheels, a series of keys, stop elements operable by said keys to fix predetermined set positions for said shaft corresponding to the primary signs, means including a main driving shaft and a connection between it and the type wheel shaft to move said last-mentioned shaft after each depression of a key to a position corresponding to the key depressed for presenting the primary sign set by said positioning of the wheel, a displacing mechanism to move the type wheel shaft from each such set position to another position for reproducing the secondary sign corresponding to the primary sign represented by the key depressed, and mechanism for printing the primary and secondary signs of the type wheels, said printing mechanism including printing levers adapted to press a paper against the type wheels.

9. A ciphering machine as claimed in claim 8 and in which one of the keys controls the production of spaces in the printing of the clear text, the shaft carrying the type wheels being provided with a selecting cam disc for controlling a selecting lever so that upon the depression of said key, the selecting lever is controlled by said cam disc to enter the path of the respective printing lever and stop the function thereof.

10. A ciphering machine as claimed in claim 8 and in which the printing mechanism includes a series of cam discs mounted on the main driving shaft for operating the printing levers and a paper feed mechanism.

11. A ciphering machine as claimed in claim 8 and in which the type wheels are slidably but non-rotatably mounted on the shaft, each of said type wheels carrying two circular rows of types, one of which contains letters and the other contains figures and other signs.

12. A ciphering machine as claimed in claim 8 and in which the type wheels are slidably but non-rotatably mounted on the shaft, each of said type wheels carrying two circular rows of types, one of which contains letters and the other contains figures and other signs, and a device for effecting an axial shifting of the type wheels in order to move any desired row of types into operative position upon the depression of a corresponding shift-key.

13. A ciphering machine as claimed in claim 8 and in which the type wheels are slidably but non-rotatably mounted on the shaft, each of said type wheels carrying two circular rows of types, one of which contains letters and the other contains figures and other signs, each row of types of each type wheel having a selecting cam disc associated therewith which, in addition to its function of controlling the production of spaces in printing a clear text, also controls the shifting operation.

14. A ciphering machine as claimed in claim 8 and in which one of the keys controls the production of spaces in the printing of the clear text, the shaft carrying the type wheels being provided with a selecting cam disc for controlling a selecting lever so that upon the depression of said key, the selecting lever is controlled by said cam disc to enter the path of the respective printing lever and stop the function thereof, each type wheel having two axially spaced rows of signs and a shift controlling lever operated by the selecting lever under the control of the selecting cam disc.

15. A ciphering machine as claimed in claim 8 and in which one of the keys controls the production of spaces in the printing of the clear text, the shaft carrying the type wheels being provided with a selecting cam disc for controlling a selecting lever so that upon the depression of said key, the selecting lever is controlled by said cam disc to enter the path of the respective printing lever and stop the function thereof, each type wheel having two axially spaced rows of signs and a shift controlling lever operated by the selecting lever under the control of the selecting cam disc, a shift axle, a fork on said axle to axially displace the type wheel, a shift arm on said axle, a pair of pins on said shift arm, a shift cam on the main shaft to engage said pins for moving the shift arm to cause a rotation of the shift axle, said pins being arranged to be moved into contact with said shift cam by the shift controlling lever.

16. A ciphering machine as claimed in claim 8 and in which one of the keys controls the production of spaces in the printing of the clear text, the shaft carrying the type wheels being provided with a selecting cam disc for controlling a selecting lever so that upon the depression of said key, the selecting lever is controlled by said cam disc to enter the path of the respective printing lever and stop the function thereof, each type wheel having two axially spaced rows of signs and a shift controlling lever operated by the selecting lever under the control of the selecting cam disc, a shift axle, a fork on said axle to axially displace the type wheel, a shift arm on said axle, a pair of pins on said shift arm, a shift cam on the main shaft to engage said pins for moving the shift arm to cause a rotation of the shift axle, said pins being arranged to be moved into contact with said shift cam by the shift controlling lever, and cams on the main shaft for moving the pins of the shifting mechanism to inoperative position, out of the range of the shift cam.

17. In a ciphering machine, type wheels carrying primary signs and secondary signs, a rotatable shaft for carrying said type wheels, a series of keys, stop elements operable by said keys to fix predetermined set positions for said shaft corresponding to the primary signs, means including a main driving shaft and a connection between it and the type wheel shaft to move said last-mentioned shaft after each depression of a key to a position corresponding to the key depressed for presenting a primary sign according to said positioning of one of said wheels, a displacing mechanism to move the type wheel shaft from each such set position to another position for presenting the secondary sign corresponding to the primary sign represented by the key depressed, mechanism for printing the secondary sign presented, said printing mechanism including printing levers adapted to press a paper against a type wheel, a control shaft for manual operation, and means carried by said shaft to retain the stop arm of the paper mechanism in the position in which said stop arm allows the advance of the paper by only one step at a time.

18. In a ciphering machine, type wheels carrying primary signs and secondary signs, a rotatable shaft for carrying said type wheels, a series of keys, stop elements operable by said keys to fix predetermined set positions for said shaft corresponding to the primary signs, means including a main driving shaft and a connection between it and the type wheel shaft to move said last-mentioned shaft after each depression of a key to a position corresponding to the key depressed for presenting a primary sign set by said positioning of the shaft, a displacing mechanism to move the type wheel shaft from each such set position to another position for presenting the secondary sign corresponding to the primary sign represented by the key depressed, mechanism for printing the secondary sign presented, said printing mechanism including printing levers adapted to press a paper against the type wheels, a control shaft for manual operation, and means carried by said shaft to retain the stop arm of the paper mechanism in the position in which said stop arm allows the advance of the paper by only one step at a time, said manually-operable control shaft having means thereon for controlling locking arms mounted on the shift axle for preventing the rocking of the selecting levers in order in the printing of a cipher text to also permit printing of the sign of the key used for indicating word spaces.

19. In a ciphering machine, type wheels carrying primary signs and secondary signs, a rotatable shaft for carrying said type wheels, a series of keys, stop elements operable by said keys to fix predetermined set positions for said shaft corresponding to the primary signs, means including a main driving shaft and a connection between it and the type wheel shaft to move said last-mentioned shaft after each depression of a key to a position corresponding to the key depressed for presenting a primary sign according to said positioning of the shaft, a displacing mechanism to move the type wheel shaft from each such set position to another position for presenting the secondary sign corresponding to the primary sign represented by the key depressed, mechanism for printing the secondary sign of the type wheel, said printing mechanism including printing levers adapted to press a paper against the secondary sign presented, a control shaft for manual operation, and means carried by said shaft to retain the stop arm of the paper mechanism in the position in which said stop arm allows the advance of the paper by only one step at a time, said manually-operable control shaft having means thereon for controlling locking arms mounted on the shift axle for preventing the rocking of the selecting levers in order in the printing of a cipher text to also permit printing of the sign of the key used for indicating word spaces, said locking arms for the selecting levers having means for preventing the shifting movement of the respective shift arms, in order that the ciphering position of the control shaft, the primary shift arm and in the deciphering position of the control shaft, the secondary shift arm may be held against movement.

BORIS CAESAR WILHELM HAGELIN.